US012701552B2

(12) United States Patent
Guzelgoz et al.

(10) Patent No.: US 12,701,552 B2
(45) Date of Patent: *Aug. 4, 2026

(54) METHODS AND APPARATUS FOR DESCRAMBLING RECEIVED UPLINK TRANSMISSIONS

(71) Applicant: Marvell Asia Pte, Ltd., Singapore (SG)

(72) Inventors: Sabih Guzelgoz, San Jose, CA (US); Hong Jik Kim, San Jose, CA (US)

(73) Assignee: Marvell Asia Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/759,618

(22) Filed: Jun. 28, 2024

(65) Prior Publication Data

US 2024/0357561 A1 Oct. 24, 2024

Related U.S. Application Data

(63) Continuation of application No. 18/136,809, filed on Apr. 19, 2023, now Pat. No. 12,063,629, which is a continuation of application No. 17/239,272, filed on Apr. 23, 2021, now Pat. No. 11,647,485, which is a continuation of application No. 16/427,069, filed on May 30, 2019, now Pat. No. 11,006,392.

(60) Provisional application No. 62/678,938, filed on May 31, 2018.

(51) Int. Cl.
*H04W 72/04* (2023.01)

(52) U.S. Cl.
CPC .................................. *H04W 72/04* (2013.01)

(58) Field of Classification Search
CPC ... H04L 1/0045; H04L 1/0073; H04L 1/1664; H04L 1/1671; H04L 5/0053; H04W 72/04
See application file for complete search history.

(56) References Cited

U.S. PATENT DOCUMENTS

| | | | | |
|---|---|---|---|---|
| 2010/0211803 A1* | 8/2010 | Lablans | ........... | G11B 20/00086 |
| | | | | 713/193 |
| 2011/0300849 A1* | 12/2011 | Chan | ..................... | H04L 5/0055 |
| | | | | 455/422.1 |
| 2012/0213374 A1* | 8/2012 | Ikeda | ................... | H04N 7/1675 |
| | | | | 380/287 |
| 2017/0230509 A1* | 8/2017 | Lablans | .............. | H04J 13/0033 |
| 2019/0253219 A1* | 8/2019 | Fan | ......................... | H04L 5/001 |

FOREIGN PATENT DOCUMENTS

WO WO-2009046330 A1 * 4/2009 ....... H04L 25/03866

* cited by examiner

*Primary Examiner* — Rina C Pancholi
(74) *Attorney, Agent, or Firm* — JW Law Group; James M. Wu

(57) ABSTRACT

Methods and apparatus for providing a resource element identification system to process received uplink transmissions. A process for facilitating information processing, in one embodiment, is capable of receiving resource elements ("REs") of an uplink transmission from a communication network. Upon generating normalized REs via a gain normalizer in accordance with a first set of parameters, an inverse transform block is able to generate time domain signals by performing an inverse transform of normalized REs to in response to a second set of parameters. The process facilitates to detect, via a processing type detector, one of two processing types in response to normalized REs and a third set of parameters.

50 Claims, 9 Drawing Sheets

100

140

150

900 →

METHODS AND APPARATUS FOR DESCRAMBLING RECEIVED UPLINK TRANSMISSIONS

PRIORITY

This patent application is a continuation patent application of a U.S. patent application with a Ser. No. 18/136,809, filed on Apr. 19, 2023 in the name of the same inventor(s) and entitled "Methods and Apparatus for Descrambling Received Uplink Transmissions," issued into a U.S. patent with U.S. Pat. No. 12,063,629, which is a continuation patent application of U.S. patent application with a Ser. No. 17/239,272, filed on Apr. 23, 2021 in the name of the same inventor(s) and entitled "Methods and Apparatus for Descrambling Received Uplink Transmissions," issued into a U.S. patent with U.S. Pat. No. 11,647,485, which is a continuation patent application of U.S. patent application with a Ser. No. 16/427,069, filed on May 30, 2019 in the name of the same inventor(s) and entitled "Methods and Apparatus for Descrambling Received Uplink Transmissions," issued into a U.S. patent with U.S. Pat. No. 11,006, 392, which further claims priority from U.S. Provisional application having a Ser. No. 62/678,938, filed on May 31, 2018, and entitled "Method and Apparatus for Sharing Partial Results during Demapping Process," all of which are hereby incorporated herein by reference in their entirety.

FIELD

The exemplary embodiments of the present invention relate to operation of telecommunications networks. More specifically, the exemplary embodiments of the present invention relate to receiving and processing data streams using a wireless telecommunication network.

BACKGROUND

With a rapidly growing trend of mobile and remote data access over a high-speed communication network such as Long Term Evolution (LTE), fourth generation (4G), fifth generation (5G) cellular services, accurately delivering and deciphering data streams become increasingly challenging and difficult. The high-speed communication network, which is capable of delivering information includes, but is not limited to, wireless networks, cellular networks, wireless personal area networks ("WPAN"), wireless local area networks ("WLAN"), wireless metropolitan area networks ("MAN"), or the like. While WPAN can be Bluetooth or ZigBee, WLAN may be a Wi-Fi network in accordance with IEEE 802.11 WLAN standards.

In 5G systems, reference signals, data, and uplink control information (UCI) may be included in uplink transmissions from user equipment. The reference signals (RS) are used to estimate channel conditions or for other purposes. However, the reference signals are mixed in with data so that the reference signals must be accounted for when the data and/or UCI information is processed. For example, when processing resource elements (REs) received in an uplink transmission, special processing may be needed to skip over resource elements that contain reference signals. Even if the reference signals are set to zero or empty, their resource elements still need to be accounted for when processing the received data. It is also desirable to provide efficient descrambling and combining functions to process received uplink transmissions.

Therefore, it is desirable to have a system that enables efficient processing of data and UCI information received in uplink transmissions.

SUMMARY

In various exemplary embodiments, methods and apparatus are provided for a descrambling system that enables fast and efficient processing of received 4G and/or 5G uplink transmissions. In various exemplary embodiments, the descrambling system descrambles resource elements received in uplink transmissions. In an embodiment, descrambling sequences are generated using one or more linear feedback shift registers (LFSRs). The descrambling sequences are used to descramble resources elements of each received symbol. After the resource elements in each symbol are descrambled, the state of the LFSR is saved in a memory. The state is then restored to the LFSRs before descrambling resource elements of the next symbol so that the output of the LFSRs is continuous over multiple symbols. Thus, the descrambling sequences can be generated in an efficient and continuous fashion to descramble resource elements of multiple symbols.

In an embodiment, an RE identifier indexes and categorizes uplink control information (UCI) of the received uplink symbols into one of three categories. For example, the UCI information comprises hybrid automatic repeat request ("HARQ") acknowledgements ("ACK"), first channel state information ("CSI1"), and second channel state information (CSI2). For example, category 0 is data or CSI2 information, category 1 is ACK information, and category 2 is CSI1 information. In one embodiment, the categorization information is forwarded to a combiner/extractor that receives the descrambled resource elements. The categorization information is used to identify and combine uplink control information from the descrambled resources elements for each symbol. For example, resource elements containing ACK are combined, resource elements containing CSI1 are combined, and resource elements containing CSI2 are combined. At the end of each symbol, the data and combined UCI information is output from the combiner/extractor. Thus, in various exemplary embodiments, received uplink control information is descrambled and combined to provide efficient processing and enhanced system performance.

In an embodiment, a method is provided that includes receiving soft-demapped symbols that comprises resource elements. The method also includes descrambling the resource elements of the symbols one-by-one using descrambling bits generated by at least one linear feedback shift register (LFSR). After each symbol is descrambled, a state of the at least one LFSR is stored as a stored state. The method also comprises restoring the stored state to the at least one LFSR before a next symbol is descrambled so that generation of the descrambling bits continues from symbol to symbol. The method also comprises forwarding the descrambled symbols to a downstream combining function.

In an embodiment, an apparatus is provided that includes a receiver that receives soft-demapped symbols that comprises resource elements. The apparatus also includes a descrambler that descrambles the resource elements of the symbols one-by-one using descrambling bits generated by at least one linear feedback shift register (LFSR). After each symbol is descrambled, a state of the at least one LFSR is stored as a stored state. The descrambler restores the stored state to the at least one LFSR before a next symbol is descrambled so that generation of the descrambling bits continues from symbol to symbol. The apparatus also includes an output interface that forwards the descrambled symbols to a downstream combining function.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
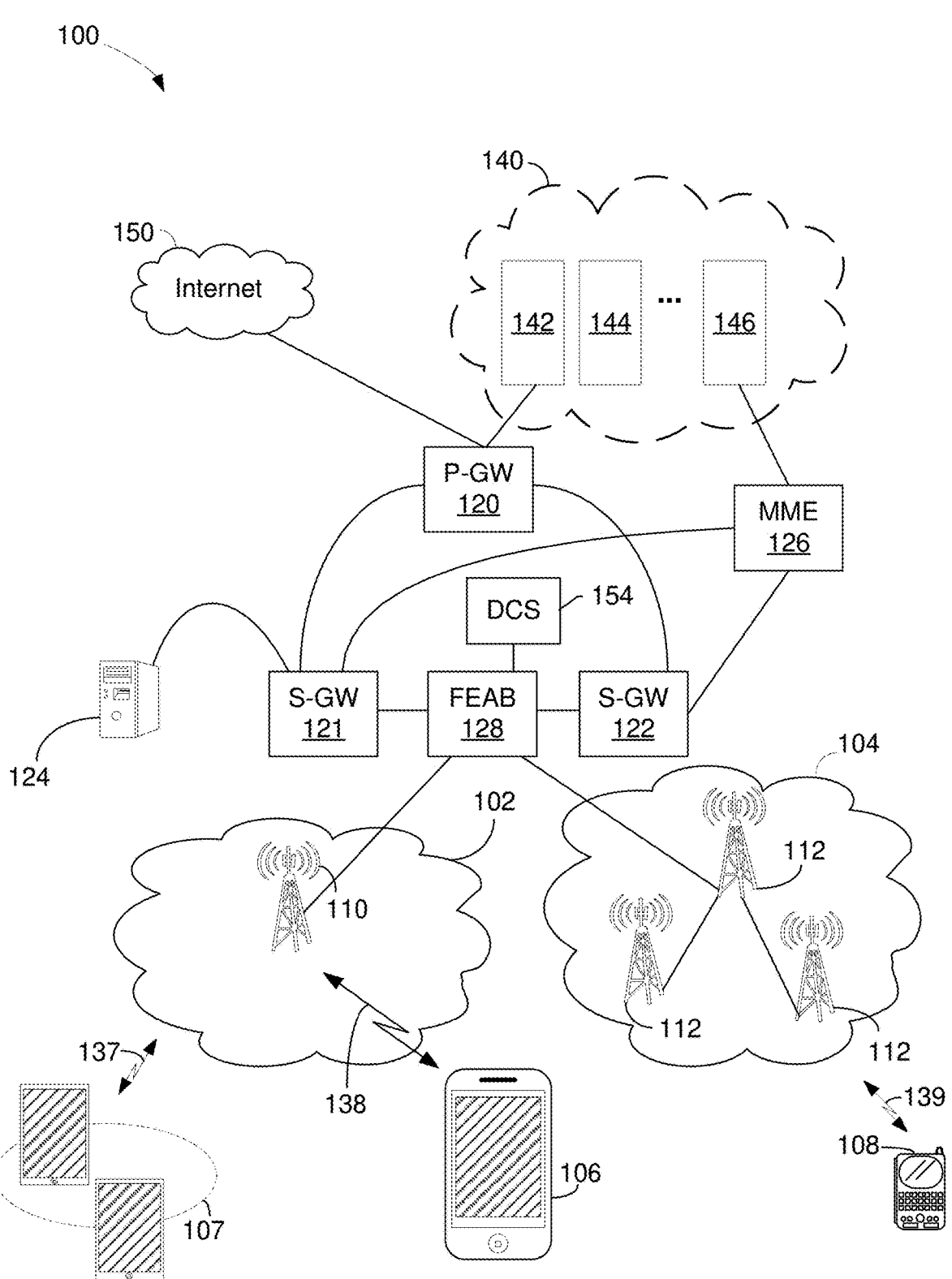
FIG. 1 shows a block diagram of a communication network in which resource elements received in uplink transmissions from user equipment are descrambled and combined by exemplary embodiments of a descrambling and combining system.

Aspects of the present invention are described below in the context of methods and apparatus for processing uplink information received in a wireless transmission.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 shows a block diagram of a communication network 100 in which resource elements received in uplink transmissions from user equipment are descrambled and combined by exemplary embodiments of a descrambling and combining system 154. The network 100 includes packet data network gateway ("P-GW") 120, two serving gateways ("S-GWs") 121-122, two base stations (or cell sites) 102-104, server 124, and Internet 150. P-GW 120 includes various components 140, such as billing module 142, subscribing module 144, and/or tracking module 146 to facilitate routing activities between sources and destinations. It should be noted that the underlying concept of the exemplary embodiments would not change if one or more blocks (or devices) were added to or removed from network 100.

The network 100 may operate as a fourth generation ("4G"), Long Term Evolution (LTE), Fifth Generation (5G), New Radio (NR), or combination of 4G and 5G cellular network configurations. Mobility Management Entity (MME) 126, in one aspect, is coupled to base stations (or cell site) and S-GWs capable of facilitating data transfer between 4G LTE and 5G. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 4G and 5G packet core networks.

Base station 102 or 104, also known as cell site, node B, or eNodeB, includes one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

To improve efficiency and/or speed-up processing of uplink control information received in uplink transmissions from user equipment, the descrambling and combining system 154 is provided to descramble and combine data and UCI information received in uplink transmissions. A more detailed description of the DCS 154 is provided below.

Figure 2:
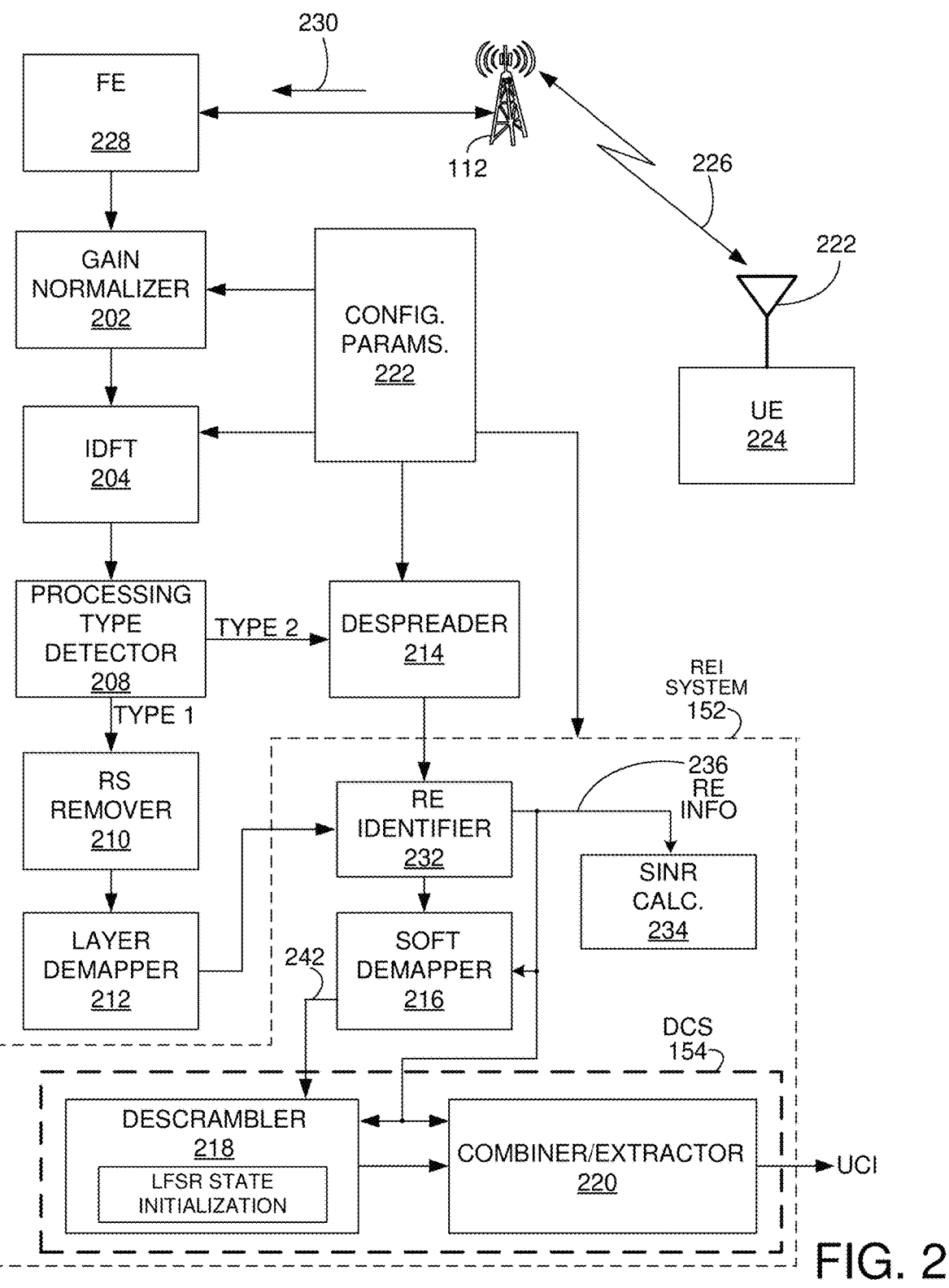
FIG. 2 shows an exemplary detailed embodiment of a resource element identification system.

FIG. 2 shows an exemplary detailed embodiment of an REI system 152. FIG. 2 shows user equipment ("UE") 224 having antenna 222 that allows wireless communication with base station 112 through wireless transmissions 226. The UE 224 transmits uplink communications 230 that are received by base station front end (FE) 228. In an embodiment, the base station includes gain normalizer 202, inverse transform block (IDFT) 204, configuration parameters 222, processing type detector 208, RS remover 210, layer demapper 212, despreader 214, and the REI system 152. In an embodiment, the REI system 152 comprises, RE identifier 232, soft demapper 216, SINR calculator 234 and the DCS 154. In an embodiment, the DCS 154 comprises descrambler 218 and combiner/extractor 220.

In an embodiment, the receiver of the uplink transmission processes 1 symbol at a time, which may come from multiple layers for NR, and the receiver of the uplink transmission processes the whole subframe or slot of a layer for LTE covering 1 ms transmission time interval (TTI), 7-OFDM symbol (OS) short(s) TTI, and 2/3-OS sTTI. The modulation order can be derived as follows.

1. ($\pi/2$) BPSK for NR
2. ($\pi/2$) BPSK for LTE sub-PRB, QPSK, 16QAM, 64QAM, and 256QAM Furthermore, demapping rules apply to constellations as defined in LTE (4G) and/or NR (5G) Standards.

Configuration Parameters (Block 222)

In an embodiment, the configuration parameters 222 comprise multiple fields that contain parameters for use by multiple blocks shown in FIG. 2. For example, some of the configuration parameters 222 control the operation of the gain normalizer 202, IDFT 204 and REI system 152. In an embodiment, the configuration parameters 222 may indicate that the gain normalizer 202 and the IDFT 204 are to be bypassed. In an embodiment, the configuration parameters 222 are used by the soft demapper 216 to determine when to apply special treatment when soft demapping received resource elements. The configuration parameters 222 are also used to control the operation of the descrambler 218, combiner/extractor 220, and/or the SINR calculator 234.

Gain Normalizer (Block 202)

In an embodiment, the gain normalizer 202 performs a gain normalization function on the received uplink transmission. For example, the gain normalizer 202 is applicable to LTE and NR DFT-s-OFDM cases. Input samples will be normalized as follows per data symbol per subcarrier with a norm gain value calculated per symbol as follows.

$$\text{Gainnorm\_out}[Ds][sc] = (\text{Gainnorm\_in}[Ds][sc]) / (\text{Norm\_Gain}[Ds])$$

IDFT (Block 204)

The IDFT 204 operates to provide an inverse transform to generate time domain signals. In an embodiment, the IDFT 204 is enabled only for LTE and NR DFT-s-OFDM and LTE sub-PRB. In an embodiment, the inputs and outputs are assumed to be 16 bits I and Q values, respectively. The DFT and IDFT operations are defined as follows.

$$DFT: X[K] = \frac{1}{\sqrt{N}} \sum_{n=0}^{N-1} x[n] W_N^{kn}$$

and $$IDFT: X[K] = \frac{1}{\sqrt{N}} \sum_{n=0}^{N-1} x[n] W_N^{-kn}$$

Where $$W_N^{kn} = e^{-2\pi j/N}$$

Processing Type Detector (Block 208)

In exemplary embodiments, the processing type detector 214 detects the type of processing to be performed by the system. For example, this information may be detected from the configuration parameters 222. In an embodiment, the processing type detector 208 operates to detect one of two processing types, which cover the operation of the system as follows.

1. Type 1-5G NR DFT-s-OFDM
2. Type 1-5G NR CP-OFDM
3. Type 2-5G NR PUCCH Format 4

RS Remover (Block 210)

In an embodiment, the RS remover 210 operates during Type 1 processing to remove RS resource elements from the received data stream to produce a stream of data that is input to the layer demapper. For example, the RE locations of the RS symbols are identified and the data is re-written into one or more buffers to remove the RS symbols to produce an output that contains only data. In an embodiment, Type 1 processing includes RS/DTX removal, layer demapping with an interleaving structure, soft demapping, and descrambling. A benefit of removal of the RS REs before layering is to enable a single shot descrambling process without any disturbance in a continuous fashion with no extra buffering.

Layer Demapper (Block 212)

In an embodiment, data and signal to interference noise ratio (SINR) coming from multiple layers of a certain subcarrier will be transferred into a layer demapping circuit (not shown) via multi-threaded read DMA operation. In this case, each thread will point to the memory location of different layers for a certain symbol. The layer demapper 212 produces demapped data and multiple pSINR reports per layer. In an embodiment, for NR the DMRS/PTRS/DTX REs will be removed from the information stream prior to soft demapping for both I/Q and SINR samples.

Despreader (Block 214)

In an embodiment, the despreader 214 provides despreading Type 2 processing for PUCCH Format 4 only. Despreading comprises combining the repeated symbols along the frequency axis upon multiplying them with the conjugate of the proper spreading sequence. The spreading sequence index as well as the spreading type for combining the information in a correct way will be given by the configuration parameters 222. This process is always performed over 12 REs in total. The number of REs that will be pushed into subsequent blocks will be reduced by half or ¼th after despreading depending upon the spreading type. Combined results will be averaged and stored as 16-bit information before soft demapping.

REI System (Block 152)

In an embodiment, the REI system 152 comprises, the RE identifier 232, the soft demapper 216, the descrambler 218, the combiner/extractor 220, and the SINR calculator 234. During operation the REI system 152 categorizes resource elements and passes these categorized REs to the soft demapper 216 and one or more other blocks of the REI system 152. In an embodiment, the soft demapper 216 uses the categorized REs to determine when to apply special treatment to the soft demapping process.

Resource Element Identifier (Block 232)

In an embodiment, the RE identifier 232 operates to process a received information stream of resource elements to identify, index, and categorized each element. An index and categorization of each element (e.g., RE information 236) is passed to the soft demapper 216 and other blocks of the REI system 152. A more detailed description of the operation of the RE identifier 232 is provided below.

Figure 3:
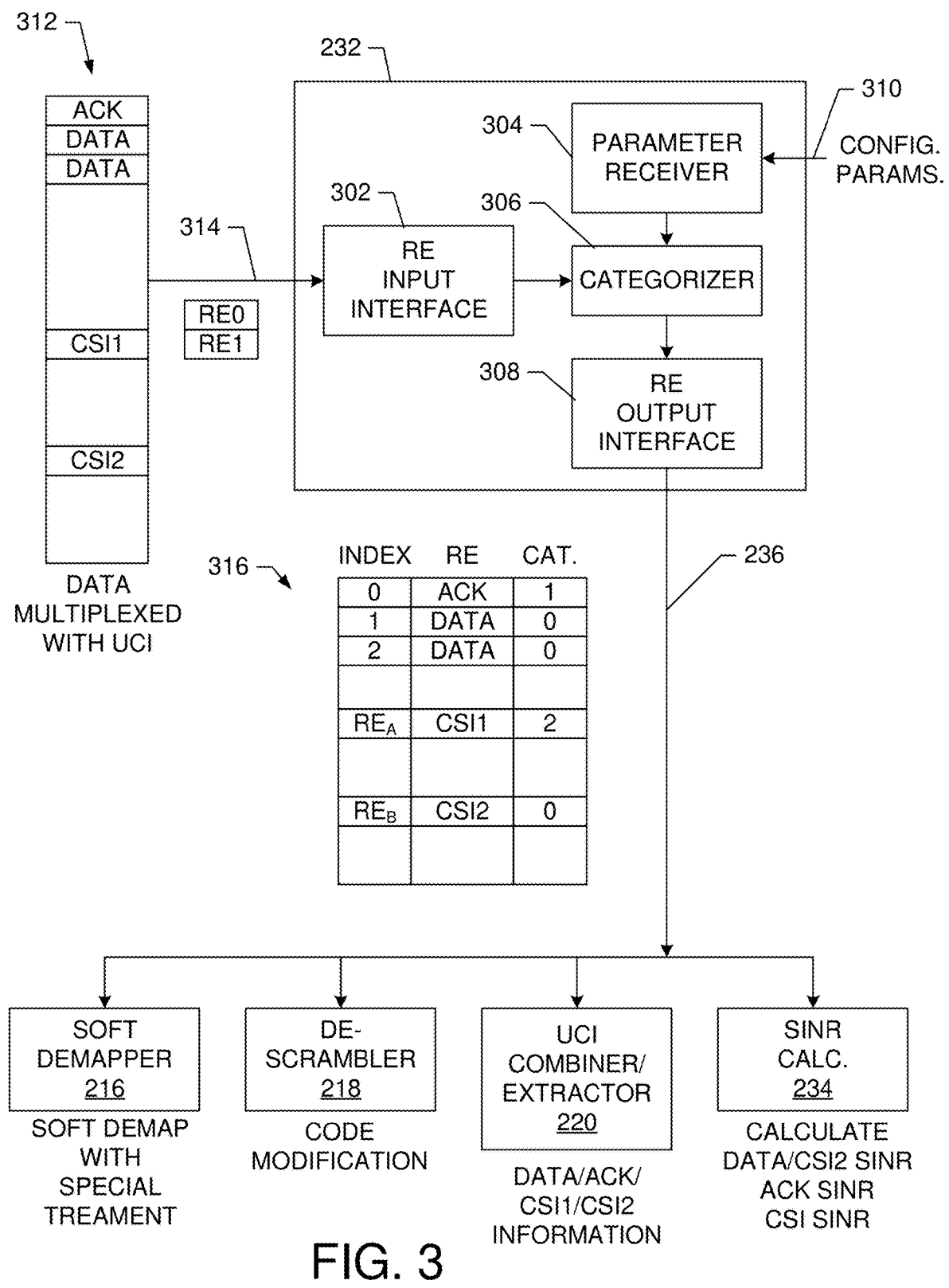
FIG. 3 shows a block diagram illustrating a detailed exemplary embodiment of an RE identifier block shown in FIG. 2.

FIG. 3 shows a block diagram illustrating a detailed exemplary embodiment of the RE identifier 232 shown in FIG. 2. As illustrated in FIG. 3, the RE identifier 232 comprises RE input interface 302, parameter receiver 304, categorizer 306, and RE output interface 308.

During operation, an uplink transmission is received and processed by the above described blocks to produce an information stream, such as the information stream 312. For example, the received uplink transmission is processed by at least one of the processing type detector 208, layer demapper 212 or the despreader 214. As a result, the information stream 312 does not contain any reference signals (RS) but contains data or data multiplexed with UCI information and this stream is input to the RE identifier 232.

The information stream 312, in one embodiment, includes information or data bits and UCI bits. In one example, the UCI bits, such as ACK bits, CSI1 bits, and/or CSI2 bits, are scattered throughout information stream 312. For instance, UCI bits are mixed with the data bits as illustrated.

In an embodiment, during 5G operation, the RE identifier 232 correctly identifies the RE indices of the UCI bits for soft demapper special treatment, descrambler code modification, and UCI combining/extraction as shown in FIG. 2. The RE indices of the UCI bits are also used for generating the SINR report values for ACK and CSI1 as well for NR CP-OFDM operation.

In an embodiment, the RE identification process will process 2 REs per cycle, indicated at 314. For example, the resource elements of the received stream 312 are received by the RE input interface 302, which provides the received information to the categorizer 306. The parameter receiver 304 receives parameters 310 from the configuration parameter block 222. The categorizer 306 uses these parameters to categorize the received resource elements and after categorizing the received REs, the categorizer 306 stores the categorized REs in an array, such as the array 316. In an embodiment, the identification of REI can be obtained based on multiple hypothesizes of RE0. Similarly, RE2 identification can be derived based on multiple hypothesizes of RE0 and RE1. The RE output interface 308 outputs the categorized REs to the soft demapper 216, descrambler 218, UCI combiner 220, and SINR calculator 234. In one aspect, the components of soft demapper 216, descrambler 218, UCI combiner 220, and SINR calculator 234 are interconnected for transferring certain information between the components.

In various embodiments, the soft demapper 216 provides special treatment to REs based on certain UCI categories. The descrambler 218 is capable of providing code modification based on certain UCI categories. The UCI combiner/extractor 220 is capable of combining DATA, ACK, CSI1 and/or CSI2 information. The SINR calculator 234 is capable of calculating data/CSI2 SINR, as well as other RE related SINRs, such as an ACK SINR and a CSI SINR.

Soft Demapper

The soft demapping principle is based on computing the log-likelihood ratio (LLR) of a bit that quantifies the level of certainty on whether it is logical zero or one. The Soft demapper 216 processes symbol by symbol and RE by RE within a symbol.

The soft demapping principle is based on computing the log-likelihood ratio (LLR) of a bit that quantifies the level of certainty on whether it is logical zero or one. Under the assumption of Gaussian noise, LLR for the i-th bit is given by:

$$DFT: X[K] = \frac{1}{\sqrt{N}} \sum_{n=0}^{N-1} x[n] W_N^{kn}$$

and $$IDFT: X[K] = \frac{1}{\sqrt{N}} \sum_{n=0}^{N-1} x[n] W_N^{-kn}$$

Where $$W_N^{kn} = e^{-2\pi j/N}$$

where $c_j$ and $c_k$ are the constellation points for which i-th bit takes the value of 0 and 1, respectively. Note that for the gray mapped modulation schemes given in [R1], x may be taken to refer to a single dimension I or Q. Computation complexity increases linearly with the modulation order. A max-log MAP approximation has been adopted in order to reduce the computational complexity. Note that this approximation is not necessary for QPSK since its LLR has only one term on both numerator and denominator.

$$\ln \sum_m e^{-d_m} \cong max(-d_m) = min(d_m)$$

This approximation is accurate enough especially in the high SNR region and simplifies the LLR calculation drastically avoiding the complex exponential and logarithmic operations. Given that I and Q are real and imaginary part of input samples, the soft LLR is defined as follows for ($\pi/2$) BPSK, QPSK, 16QAM, 64QAM, and 256QAM, respectively.

In an embodiment, the soft demapper 216 includes a first minimum function component ("MFC"), a second MFC, a special treatment component ("STC"), a subtractor, and/or an LLR generator. A function of soft demapper 216 is to demap or ascertain soft bit information associated to received symbols or bit streams. For example, soft demapper 216 employs soft demapping principle which is based on computing the log-likelihood ratio (LLR) of a bit that quantifies the level of certainty as to whether it is a logical zero or one. To reduce noise and interference, soft demapper 216 is also capable of discarding one or more unused constellation points relating to the frequency of the bit stream from the constellation map.

The STC, in one aspect, is configured to force an infinity value as one input to the first MFC when the stream of bits is identified and a special treatment is needed. For example, a predefined control signal with a specific set of encoding categories such as ACK with a set of predefined encoding categories requires a special treatment. One of the special treatments, in one aspect, is to force infinity values as inputs to MFCs. For example, STC force infinity values as inputs to the first and the second MFCs when the stream of bits is identified as ACK or CSI1 with a predefined encoding category. The STC, in one instance, is configured to determine whether a special treatment (or special treatment function) is required based on received bit stream or symbols. In one aspect, the 1-bit and 2-bit control signals with predefined encoding categories listed in Table 1 require special treatments. It should be noted that Table 1 is exemplary and that other configurations are possible.

TABLE 1

| No. | Control Signal with Encoding Categories | Renamed Categories |
|---|---|---|
| 1 | $O^{ACK} = 1$ | ACK[1] |
| 2 | $O^{ACK} = 2$ | ACK[2] |
| 3 | $O^{CSI1} = 1$ | CSI1[1] |
| 4 | $O^{CSI1} = 2$ | CSI1[2] |

SINR Calculator (Block 234)

The SINR calculator 234 calculates SINR for per UCI type based on categories received from REI block 232.

Descrambler (Block 218)

The descrambler 218 is configured to generate a descrambling sequence of bits or a stream of bits. For example, after generating a sequence in accordance with the input value, the descrambler determines whether a descrambling sequence modification is needed for certain categories of control information to be descrambled. For example, the descrambler 218 receives the categorized RE information 236 from the RE identifier 232 and uses this information to determine when descrambling sequence modification is required. In an embodiment, the descrambler also provides for storage of intermediate LFSR states to facilitate continuous descrambling sequence generation over multiple symbols. The descrambled resource elements of the symbols are passed to the combiner/extractor 220. A more detailed description of the descrambler 218 is provided below.

Combiner/Extractor (Block 220)

The combiner/extractor 220 provides a combining and extracting function to combine descrambled soft bits from the descrambler 218 and extract uplink control information. In an embodiment, the combiner/extractor 220 modifies it operation based on categories received from REI block 232. A more detailed description of the combiner/extractor 220 is provided below.

Figure 4A:
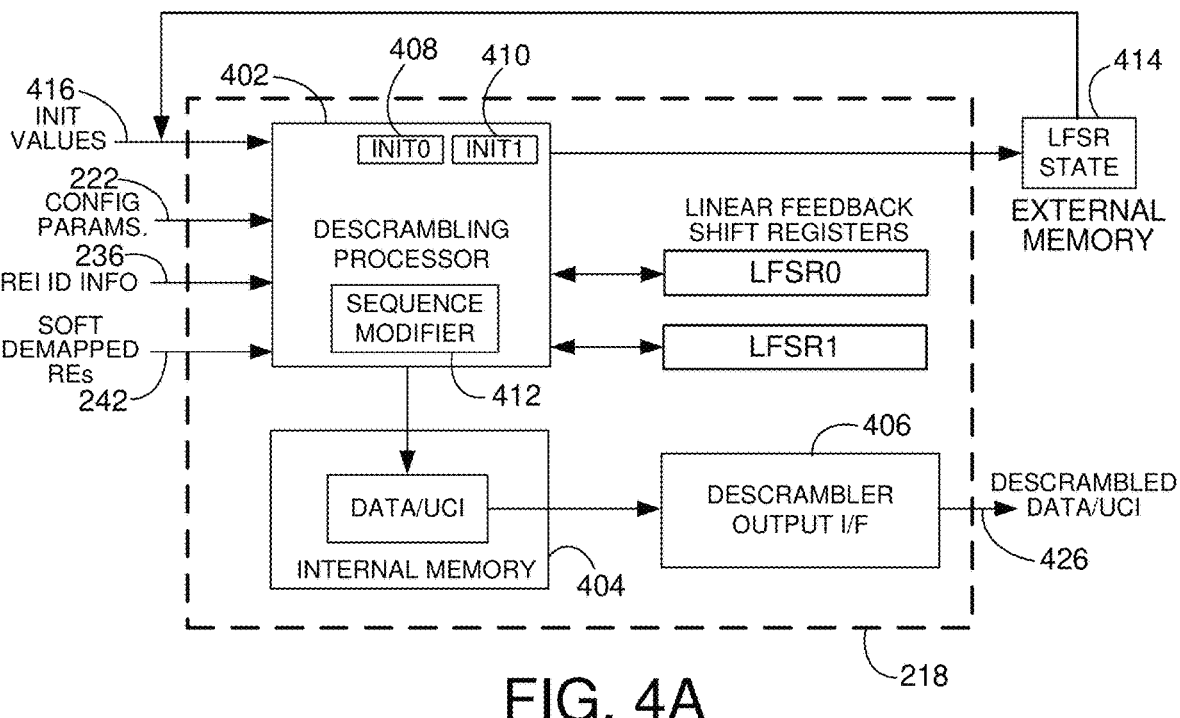
FIG. 4A shows a block diagram illustrating a detailed exemplary embodiment of a descrambler shown in FIG. 2.

FIG. 4A shows a block diagram illustrating a detailed exemplary embodiment of the descrambler 218 shown in FIG. 2. In an embodiment, the descrambler 218 comprises a descrambler processor 402, internal memory 404, linear feedback shift registers LFSR0 and LFSR1, and output interface 406. The descrambling processor 402 also includes a sequence modifier 412 that operates to modify descrambling sequences for certain categories of ACK and CSI1 information.

Figure 4B:
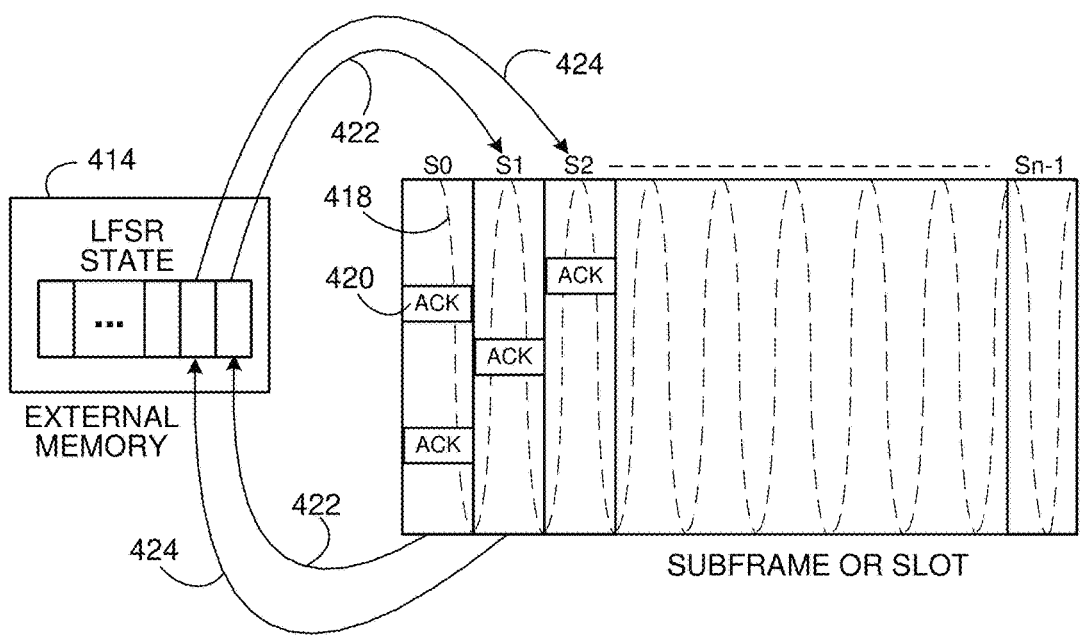
FIG. 4B shows a block diagram illustrating operations performed by the descrambler shown in FIG. 4A.

FIG. 4B shows a block diagram illustrating operations performed by the descrambler 218 shown in FIG. 4A. During operation, the descrambler processor 402 receives soft-demapped REs 242 from the soft demapper 216. The descrambler processor 402 also receives selected configuration parameters 222, the RE information 236, and initialization values 416. In an embodiment, the initialization values 416 are provided by a central processor or other receiver entity and stored as INIT0 408 and INIT1 410. The descrambler processor 402 initializes the LFSR0 and LFSR1 using initialization values INIT0 408 and INIT1 410, respectively. The shift registers LFSR0 and LFSR1 output bits that are used to determine descrambling bits that are used to descramble the received REs 242. For example, outputs of the shift registers LFSR0 and LFSR1 are mathematically combined by the descrambling processor 402 to determine descrambling bits to be used to descramble the received REs 242.

As resources elements of a first symbol are received, the descrambling processor 402 uses descrambling bits that are determined from the output of the shift registers to descramble the received REs 242. For example, as resource elements of symbol S0 are received, the descrambling processor 402 uses the generated descrambling bits to descramble the resources elements. As each RE is descrambled (as indicated by the path 418), the descrambled REs are stored in the internal memory 404. After descrambling of all the REs of the symbol is completed, the descrambling processor 402 stores the state of the shift registers LFSR0/1 into the external memory 414. For example, at the end of symbol S0, the state 422 of LFSR0/1 is stored in the external memory 414. It should also be noted that the sequence modifier 412 can be used to modify descrambling sequences for certain categories of ACK and CSI1 information.

Before REs of the next symbol (e.g., S1) are descrambled, the LSFR state 422 is restored from the external memory 414 and provided as initialization values 416 to the descrambling processor 402. Thus, the restored state allows the operation of the shift registers to continue from where they left off after the completion of descrambling the previous symbol (e.g., S0). After descrambling the symbol S1, the descrambling processor 402 stores the state of the shift registers (indicated at 424) into the external memory 414. Prior to the start of descrambling of the symbol S3, the state 424 is restored to the LFSR registers of the descrambling processor 402 as described above. This process of storing and restoring the shift registers state continues until all the REs of all the symbols have been descrambled. It should be noted that the REs include data or UCI information. For example, symbol S0 includes the ACK 420 information shown in FIG. 4B. After the REs are descrambled, they are output by the descrambler output interface 406 as descrambled REs 426.

Figure 5:
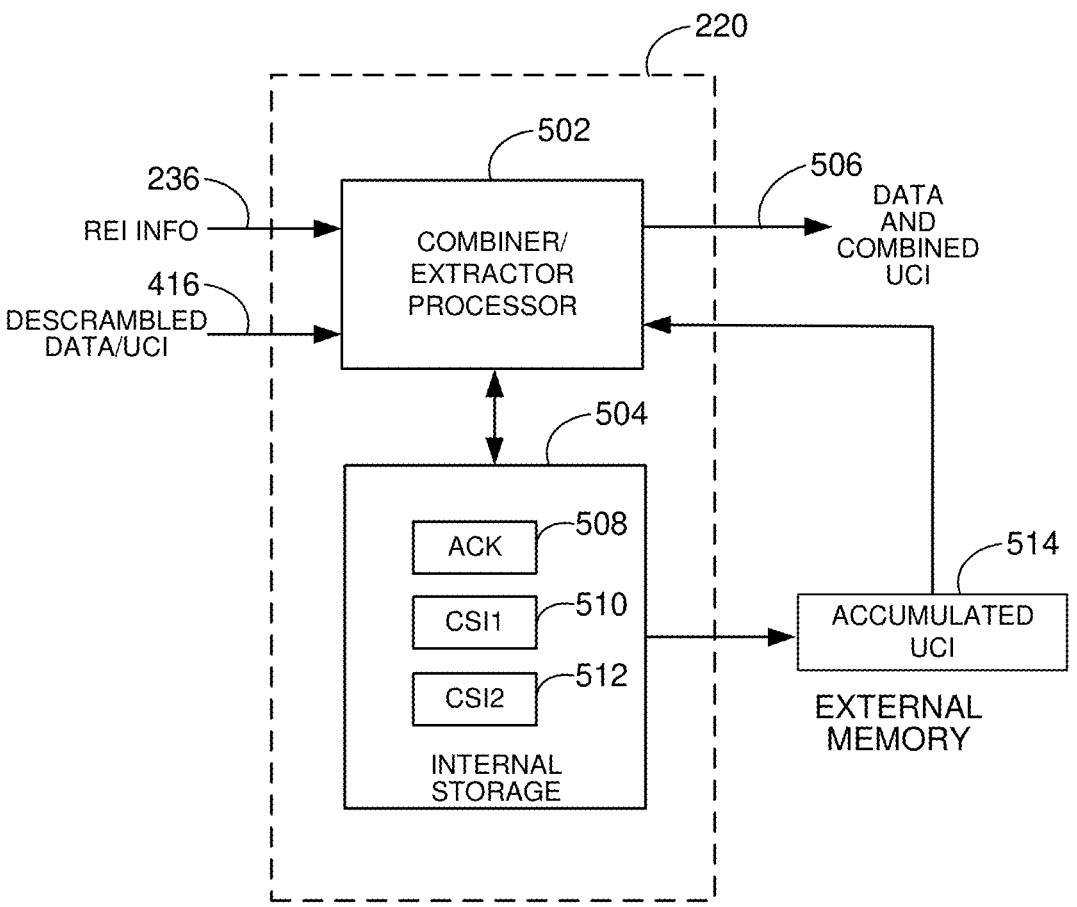
FIG. 5 shows a block diagram illustrating a detailed exemplary embodiment of a combiner/extractor shown in FIG. 2.

FIG. 5 shows a block diagram illustrating a detailed exemplary embodiment of the combiner/extractor 220 shown in FIG. 2. In an embodiment, the combiner/extractor 220 comprises combiner/extractor processor 502 and internal storage 504. During operation, the processor 502 receives the RE information 236 and the descrambled REs 416 from the descrambler 218. The processor 502 uses the RE information 236 to determine which REs represent UCI values. For example, the RE information 236 comprises indexed and categorized RE information so that the processor 502 can use this information to determine when selected UCI REs are received.

At the start of a symbol, the processor 502 initializes ACK 508, CSI1 5110, and CSI2 512 values in the memory 504. When REs containing UCI information are received, the processor 502 combines this information with values currently in the memory 504. For example, the processor 502 uses the REI information 236 to determine when ACK information bits are received and combines these bits with currently stored ACK bits 508. This process continues for ACK 508, CSI1 510, and CSI2 512, values until all REs for a symbol have been received. Once all the REs of a symbol have been received, the combined values are written out to an external memory 514. Prior to the start of the next symbol, the values in the external memory 514 are returned to the processor 502 and restored to the internal storage 504. Combining of the UCI values of the next symbol is then performed.

After the UCI information in each symbol is combined, the results are stored in the external memory 514. The process continues until the UCI information from a selected number of symbols has been combined. Once the combining process is completed, the processor 502 outputs the combined results 506 to a decoder.

Figure 6:
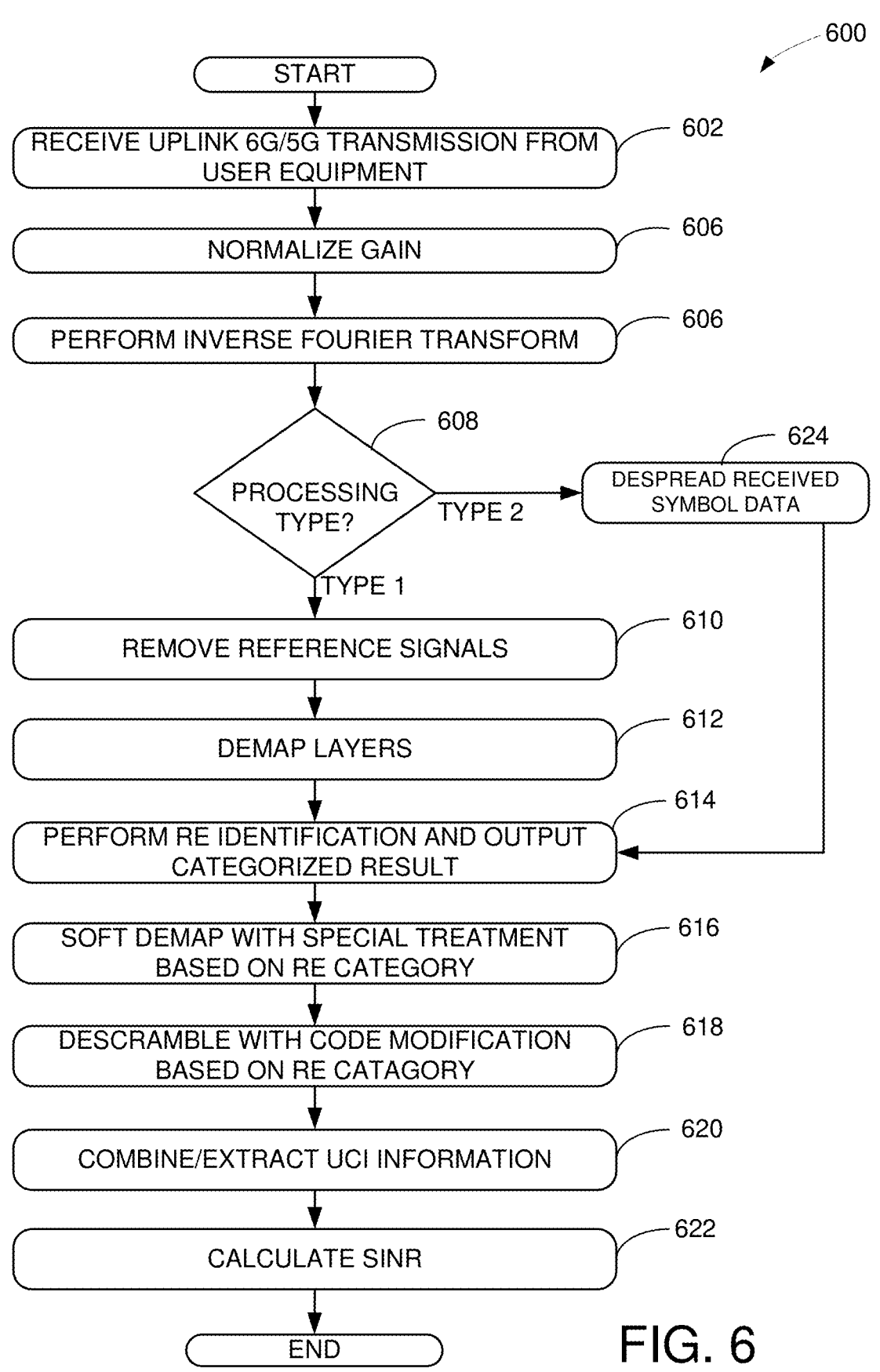
FIG. 6 shows an exemplary method for performing resource element categorization in accordance with exemplary embodiments of a resource element identification system.

FIG. 6 shows an exemplary method 600 for performing resource element categorization in accordance with exemplary embodiments of an REI system. For example, the method 600 is suitable for use with the REI system 152 shown in FIG. 2.

At block 602, uplink transmissions are received in a 5G communication network. For example, the uplink transmissions are received at the front end 228 shown in FIG. 2.

At block 604, gain normalization is performed. For example, the gain normalization is performed by the gain normalizer 202 shown in FIG. 2.

At block 606, an inverse Fourier transform is performed to obtain time domain signals. For example, this process is performed by the IDFT block 204 shown in FIG. 2.

At block 608, a determination is made as to a type of processing to be performed. For example, a description of two processing types is provided above. If a first type of processing is to be performed, the method proceeds to block 610. If a second type of processing is to be performed, the method proceeds to block 624. For example, this operation is performed by the processing type detector 208 shown in FIG. 2.

At block 624, when the processing type is Type 2, despreading is performed on the received resource elements.

For example, this operation is performed by the despreader 214 shown in FIG. 2. The method then proceeds to block 614.

When the processing type is Type 1, the follow operations are performed.

At block 610, the reference signals are removed from the received resource elements. For example, resource elements containing RS/DTX are removed. This operation is performed by the RS remover 210 shown in FIG. 2.

At block 612, layer demapping is performed. For example, the resource elements without RS/DTX are layer demapped. This operation is performed by the layer demapper 212.

At block 614, RE identification and categorization is performed. For example, as illustrated in FIG. 3, the RE identifier 232 receives a stream of REs, categorizes the REs, and then outputs the array 316 in which the REs are indexed and include categorization values.

At block 616, soft demapping is performed. For example, the soft demapper 216 soft-demaps the REs with special treatment provided based on the categorization of the received REs. The soft demapper 216 produces a soft-demapped output that is input to the descrambler 218.

At block 618, descrambling is performed. For example, the descrambler 218 receives the soft demapped bits from the soft demapper 216 and generates descrambled bits. In an embodiment, based on the categorization of the REs, a modified descrambler code is used. In an embodiment, the descrambler 218 operates to save LFSR state between symbols so that continuous descrambling code generation can be provided from symbol to symbol.

At block 620, combining and extraction of UCI information is performed. For example, the combiner/extractor 220 receives the descrambled bits, combines these bits, and extracts the UCI information. For example, the combiner/extractor 220 utilizes the RE categorization information to identify UCI resources elements and combines these elements into the memory 504. The combined UCI values are output at the end of the symbol and the memory is reinitialized for the combining UCI of the next symbol.

At block 622, SINR calculations are performed to calculate data/CSI2, ACK, and CSI1 SINR values.

Thus, the method 600 operates to provide resource element identification and categorization in accordance with the exemplary embodiments. It should be noted that the operations of the method 600 can be modified, added to, deleted, rearranged, or otherwise changed within the scope of the embodiments.

Figure 7:
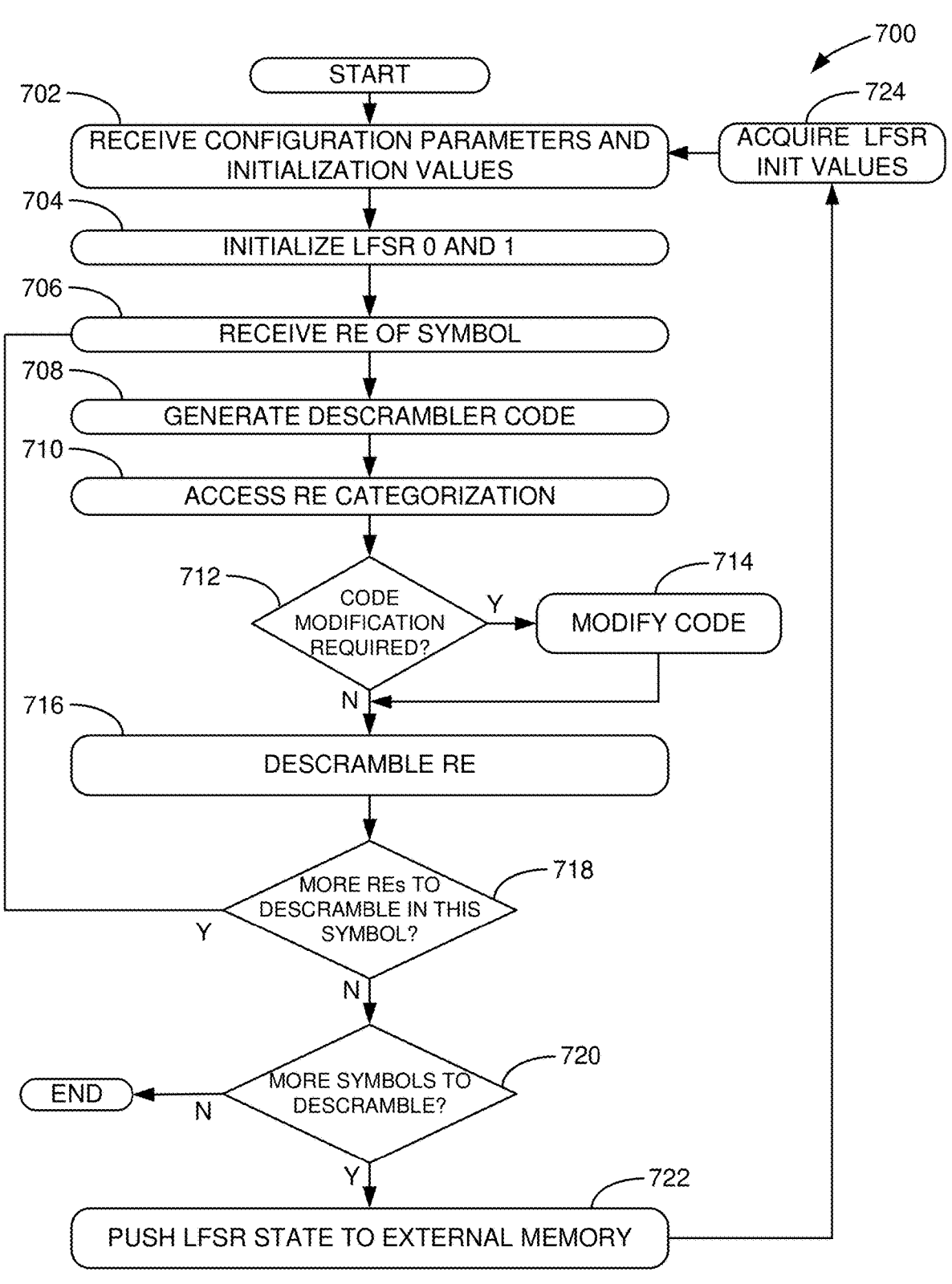
FIG. 7 shows an exemplary method for performing descrambling in accordance with exemplary embodiments of a descrambling and combining system.

FIG. 7 shows an exemplary method 700 for performing descrambling in accordance with exemplary embodiments of a descrambling and combining system. For example, the method 700 is suitable for use with the DCS 154 shown in FIG. 2.

At block 702, configuration parameters and initialization values are received by the descrambler 218. For example, the configuration parameters 222 are received by the descrambling processor 402. In addition, the initialization values 416 are received by the descrambling processor 402. In an embodiment, the initialization values 416 are received from a central processing entity at the receiver. In another embodiment, the initialization values 416 are LFSR state information received from the external memory 414.

At block 704, one or more linear feedback shift registers are initialized. For example, the processor 402 initializes the registers LFSR0 and LFSR1 with initialization values INIT0 408 and INIT1 410, respectively.

At block 706, a resource element of a symbol is received. For example, the processor 402 receives a resource element of the symbol S0 as shown in FIG. 4B.

At block 708, a descrambling code is generated. For example, the processor 402 generates the descrambling code based on the output of the shift registers LFSR0 and LFSR1.

At block 710, the RE information is accessed by the processor to determine information about the current resource element. For example, the processor 402 accesses information about the current resource element based on the RE information 236 and the parameters 222.

At block 712, a determination is made as to whether scrambling code modification should be made. For example, the processor 402 determines if a descrambling code modification is needed to descramble the current resource element based on the RE information 236 and the parameters 222. If modification of the scrambling code is needed, the method proceeds to block 714. If no modification is needed, the method proceeds to block 716.

At block 714, the scrambling code is modified by the processor 402 as necessary. For example, the sequence modifier 412 modifies the scrambling code for certain types of ACK and CSI1 information.

At block 716, the RE is descrambled using the scrambling code. For example, the processor 402 descrambles the RE using the current scrambling code.

At block 718, a determination is made as to whether there are more REs in the current symbol to descramble. For example, the processor 402 makes this determination from the configuration parameters 222 and/or the RE information 236. If there are no more symbols to descramble, the method proceeds to block 720. If there are more symbols to descramble in the current symbol, the method proceeds to block 706.

At block 720, a determination is made as to whether there are more symbols to descramble. For example, the processor 402 makes this determination from the configuration parameters 222 and/or the RE information 236. If there are no more symbols to descramble, the method end. If there are more symbols to descramble, the method proceeds to block 722.

At block 722, the LFSR state is stored. For example, the processor 402 pushes the current state of the registers LFSR0 and LFSR1 to the external memory 414, for example, as shown by 422.

At block 724, the LFSR state is restored prior to descrambling the next symbol. For example, the stored LFSR state is provided to the processor 402 as a new set of initialization values 416 that are used to restore the state of the registers LFSR0 and LFSR1. Thus, the LFSR generates descrambling sequences based on the restored state. The method then proceeds to block 706 where descrambling continues until the desired number of symbols have been descrambled.

Thus, the method 700 operates to provide descrambling in accordance with exemplary embodiments of a descrambling and combining system. It should be noted that the operations of the method 700 can be modified, added to, deleted, rearranged, or otherwise changed within the scope of the embodiments.

Figure 8:
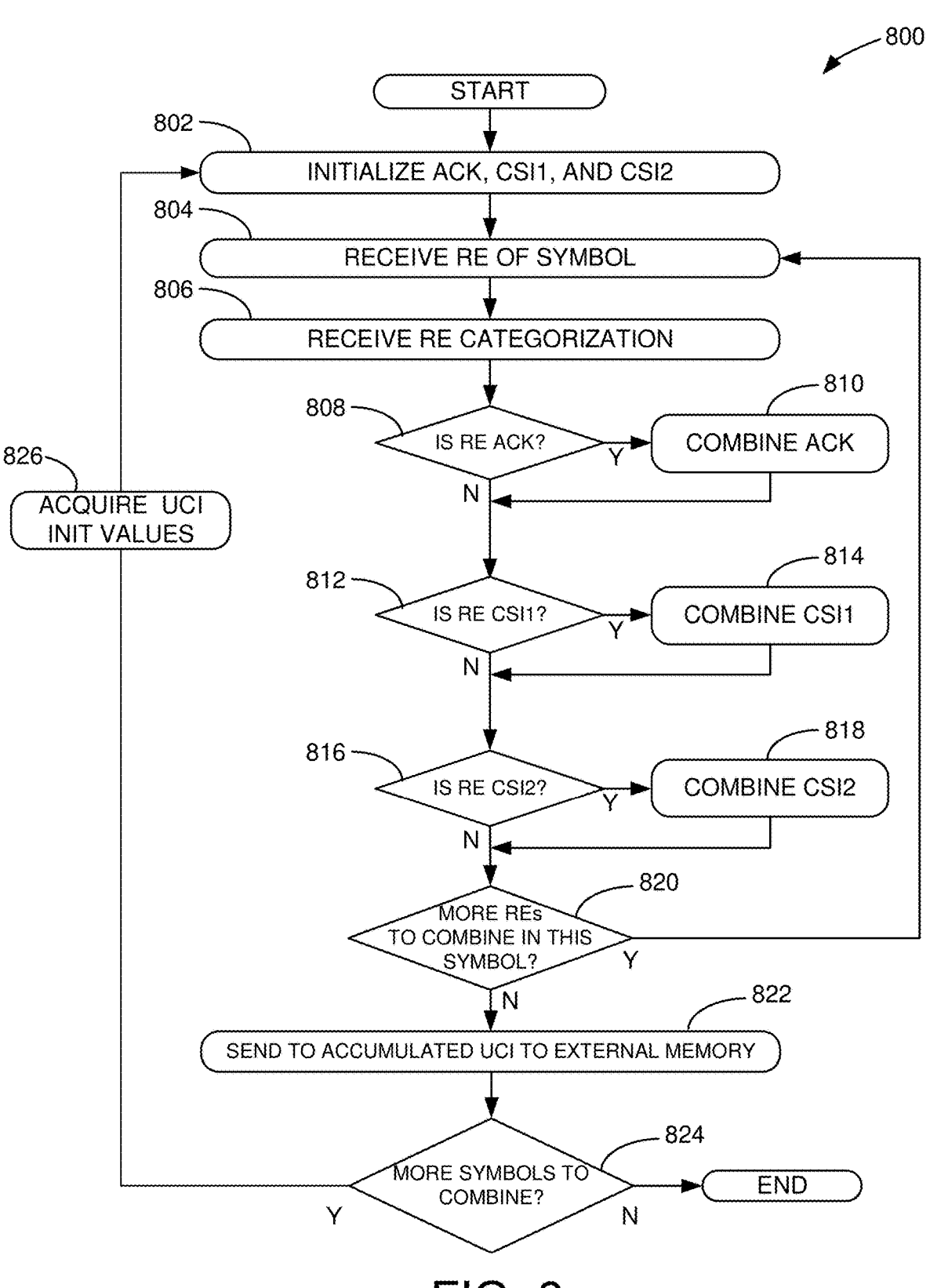
FIG. 8 shows an exemplary method for performing combining in accordance with exemplary embodiments of a descrambling and combining system.

FIG. 8 shows an exemplary method 800 for performing combining in accordance with exemplary embodiments of a descrambling and combining system. For example, the method 800 is suitable for use with the DCS 154 shown in FIG. 2.

At block 802, initialization of ACK, CSI1, and CSI2 values in a memory is performed. For example, in an embodiment, the processor 502 initializes the values of ACK 508, CSI1 510, and CSI2 512 in the memory 504.

At block 804, a descrambled RE of a symbol is received. For example, the processor 502 receives the descrambled RE 416.

At block 806, RE categorization information is received. For example, the processor 502 receives the RE information 236.

At block 808, a determination is made as to whether the current RE contains an ACK value. The processor 502 makes this determination from the RE information 236. If the current RE contains an ACK value the method proceeds to block 810. If the current RE does not contain an ACK value, the method proceeds to block 812.

At block 810, the ACK value contained in the current RE is combined with ACK values in memory. For example, the processor 502 combines the current RE value with the stored ACK value 508 and restores the combined value back into the memory 504.

At block 812, a determination is made as to whether the current RE contains a CSI1 value. The processor 502 makes this determination from the RE information 236. If the current RE contains a CSI1 value the method proceeds to block 814. If the current RE does not contain a CSI1 value, the method proceeds to block 816.

At block 814, the CSI1 value contained in the current RE is combined with CSI1 values in memory. For example, the processor 502 combines the current RE value with the stored CSI1 value 510 and restores the combined value back into the memory 504.

At block 816, a determination is made as to whether the current RE contains a CSI2 value. The processor 502 makes this determination from the RE information 236. If the current RE contains a CSI2 value the method proceeds to block 818. If the current RE does not contain a CSI2 value, the method proceeds to block 820.

At block 818, the CSI2 value contained in the current RE is combined with CSI2 values in memory. For example, the processor 502 combines the current RE value with the stored CSI2 value 512 and restores the combined value back into the memory 504.

At block 820, a determination is made as to whether there are more REs to combine in the current symbol. The processor 502 makes this determination from the RE information 236. If there are more REs to combine, the method proceeds to block 804. If there are no more REs to combine, the method proceeds to block 822.

At block 822, the accumulated UCI values are pushed to an external memory. For example, the accumulated UCI values are pushed to the external memory 514.

At block 824, a determination is made as to whether there are more symbols to combine. In an embodiment, the processor 502 makes this determination from the REI information 236. If there are no more symbols to combine, the method ends. If there are more symbols to combine, the method proceeds to block 826.

At block 826, the UCI values stored in the external memory are acquired and input to the processor 502 as new initialization values. For example, the accumulated UCI values stored in the external memory 514 are acquired by the processor 502. The method then proceeds to block 802 where the acquired UCI values from the external memory are used to initialize the UCI values 508, 510, and 512 in the internal storage 504.

Thus, the method 800 operates to provide combining in accordance with exemplary embodiments of a descrambling and combining system. It should be noted that the operations of the method 800 can be modified, added to, deleted, rearranged, or otherwise changed within the scope of the embodiments.

Figure 9:
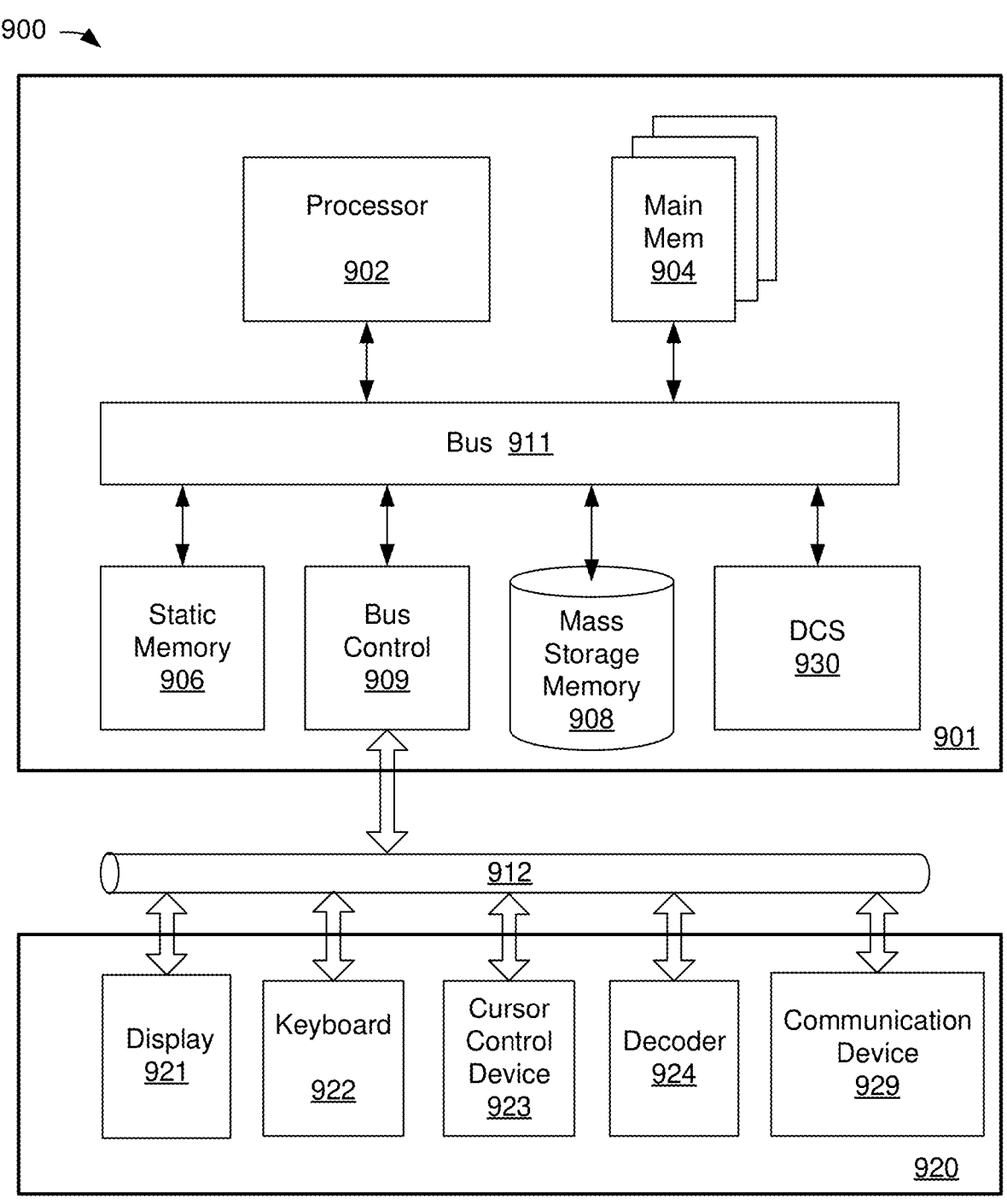
FIG. 9 shows a block diagram illustrating a processing system having an exemplary embodiment of a descrambling and combining system.

FIG. 9 shows a block diagram illustrating a processing system 900 having an exemplary embodiment of a DCS 930. It will be apparent to those of ordinary skill in the art that other alternative computer system architectures may also be employed.

The system 900 includes a processing unit 901, an interface bus 912, and an input/output ("IO") unit 920. Processing unit 901 includes a processor 902, main memory 904, system bus 911, static memory device 906, bus control unit 909, mass storage memory 908, and the DCS 930. Bus 911 is used to transmit information between various components and processor 902 for data processing. Processor 902 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 904, which may include multiple levels of cache memories, stores frequently used data and instructions. Main memory 904 may be RAM (random access memory), MRAM (magnetic RAM), or flash memory. Static memory 906 may be a ROM (read-only memory), which is coupled to bus 911, for storing static information and/or instructions. Bus control unit 909 is coupled to buses 911-912 and controls which component, such as main memory 904 or processor 902, can use the bus. Mass storage memory 908 may be a magnetic disk, solid-state drive ("SSD"), optical disk, hard disk drive, floppy disk, CD-ROM, and/or flash memories for storing large amounts of data.

I/O unit 920, in one example, includes a display 921, keyboard 922, cursor control device 923, decoder 924, and communication device 929. Display device 921 may be a liquid crystal device, flat panel monitor, cathode ray tube ("CRT"), touch-screen display, or other suitable display device. Display 921 projects or displays graphical images or windows. Keyboard 922 can be a conventional alphanumeric input device for communicating information between computer system 900 and computer operators. Another type of user input device is cursor control device 923, such as a mouse, touch mouse, trackball, or other type of cursor for communicating information between system 900 and users.

Communication device 929 is coupled to bus 912 for accessing information from remote computers or servers through wide-area network. Communication device 929 may include a modem, a router, or a network interface device, or other similar devices that facilitate communication between computer 900 and the network. In one aspect, communication device 929 is configured to perform wireless functions. Alternatively, DCS 930 and communication device 929 perform resource element categorization, descrambling and combining functions in accordance with one embodiment of the present invention.

The DCS 930, in one aspect, is coupled to bus 911 and is configured to perform resource element categorization, descrambling and combining functions on received uplink communications as described above to improve overall receiver performance. In an embodiment, the DCS 930 comprises hardware, firmware, or a combination of hardware and firmware.

While particular embodiments of the present invention have been shown and described, it will be obvious to those skilled in the art that, based upon the teachings herein, changes and modifications may be made without departing from this exemplary embodiment of the present invention and its broader aspects. Therefore, the appended claims are intended to encompass within their scope all such changes and modifications as are within the true spirit and scope of this exemplary embodiments of the present invention.

What is claimed is:

1. A method for facilitating information processing from a network communication, comprising:

receiving resource elements ("REs") of an uplink transmission from a communication network;

generating normalized REs via a gain normalizer in accordance with a first set of parameters;

providing, via an inverse transform block, time domain signals by performing an inverse transform of the normalized REs to in response to a second set of parameters; and detecting, via a processing type detector, one of two processing types in response to the normalized REs and a third set of parameters.

2. The method of claim 1, further comprising retrieving the first set of parameters, the second set of parameters, and the third set of parameters from a configuration parameter block.

3. The method of claim 1, further comprising retrieving a fourth set of parameters from a configuration parameter block for facilitating despreading operation.

4. The method of claim 3, further comprising spreading sequence index and spreading type in accordance with the normalized REs and the fourth set of parameters.

5. The method of claim 1, further comprising retrieving a fifth set of parameters from a configuration parameter block for managing descrambling operation.

6. The method of claim 5, further comprising generating descrambled REs in response to the normalized REs and the fifth set of parameters.

7. The method of claim 1, further comprising receiving a first symbol of the uplink transmission from a soft demapper.

8. The method of claim 1, further comprising retrieving at least a portion of output bits from at least one shift register for descrambling the normalized REs.

9. The method of claim 1, further comprising descrambling the normalized REs of a first symbol to generate descrambled REs of the first symbol in response to configuration parameters.

10. The method of claim 9, further comprising storing the descrambled REs in an internal memory.

11. The method of claim 1, further comprising storing state of at least one shifter register in an external memory for next descrambling of REs of a second symbol of the uplink transmission, wherein storing the state of the at least one shifter register includes restoring state of at least one linear feedback shift register ("LFSR") in accordance with previous state of LFSR stored in the external memory before descrambling REs from the second symbol.

12. The method of claim 11, further comprising allowing subsequent operation of the LFSR continued from previous descrambling of a first symbol.

13. The method of claim 11, further comprising storing current state of the LFSR in the external memory.

14. The method of claim 1, further comprising descrambling REs for a second symbol in response to data stored in a linear feedback shift register ("LESR").

15. The method of claim 1, further comprising forwarding descrambled REs of a first symbol to a downstream combining function.

16. A method for facilitating information processing from a network communication, comprising:

receiving resource elements ("REs") of an uplink transmission from a communication network;

generating normalized REs via a gain normalizer in accordance with a first set of parameters;

detecting, via a processing type detector, a type 2 processing type in response to the normalized REs and a third set of parameters; and spreading sequence index and spreading type for combining information in accordance with the normalized REs and a fourth set of parameters.

17. The method of claim 16, further comprising providing, via an inverse transform block, time domain signals by performing an inverse transform of the normalized REs to in response to a second set of parameters.

18. The method of claim 17, further comprising retrieving the first set of parameters, the second set of parameters, the third set of parameters, and the fourth set of parameters from a configuration parameter block.

19. The method of claim 16, further comprising retrieving a fifth set of parameters from a configuration parameter block for managing descrambling operation.

20. The method of claim 19, further comprising generating descrambled REs in response to the normalized REs and the fifth set of parameters.

21. The method of claim 16, further comprising receiving a first symbol of the uplink transmission from a soft demapper.

22. The method of claim 16, further comprising retrieving at least a portion of output bits from at least one shift register for descrambling the normalized REs.

23. The method of claim 16, further comprising descrambling the normalized REs of a first symbol to generate descrambled REs of the first symbol in response to configuration parameters.

24. The method of claim 23, further comprising storing the descrambled REs in an internal memory.

25. The method of claim 16, further comprising storing state of at least one shifter register in an external memory for next descrambling of REs of a second symbol of the uplink transmission, wherein storing the state of the at least one shifter register includes restoring state of at least one linear feedback shift register ("LFSR") in accordance with previous state of LFSR stored in the external memory before descrambling REs from the second symbol.

26. A method for facilitating information processing from a network communication, comprising:

receiving resource elements ("REs") of an uplink transmission from a communication network;

generating normalized REs via a gain normalizer in accordance with a first set of parameters;

detecting, via a processing type detector, a type 1 processing type in response to the normalized REs and a third set of parameters; and removing reference signals ("RS") REs from the normalized REs to generate a stream of data.

27. The method of claim 26, further comprising generating demapped data in accordance with the stream of data.

28. The method of claim 26, further comprising spreading sequence index and spreading type for combining information in accordance with the normalized REs and a fourth set of parameters when a type 2 processing type is detected.

29. The method of claim 26, further comprising providing, via an inverse transform block, time domain signals by performing an inverse transform of the normalized REs to in response to a second set of parameters.

30. The method of claim 29, further comprising retrieving the first set of parameters, the second set of parameters, the third set of parameters, and a fourth set of parameters from a configuration parameter block.

31. The method of claim 26, further comprising retrieving a fifth set of parameters from a configuration parameter block for managing descrambling operation.

32. The method of claim 26, further comprising generating descrambled REs in response to the normalized REs and a fifth set of parameters.

33. The method of claim 26, further comprising receiving a first symbol of the uplink transmission from a soft demapper.

34. An apparatus for facilitating information processing from a network communication, comprising:

means for receiving resource elements ("REs") of an uplink transmission from a communication network;

means for generating normalized REs via a gain normalizer in accordance with a first set of parameters;

means for providing, via an inverse transform block, time domain signals by performing an inverse transform of the normalized REs to in response to a second set of parameters; and means for detecting, via a processing type detector, one of two processing types in response to the normalized REs and a third set of parameters.

35. The apparatus of claim 34, further comprising means for retrieving the first set of parameters, the second set of parameters, and the third set of parameters from a configuration parameter block.

36. The apparatus of claim 34, further comprising means for retrieving a fourth set of parameters from a configuration parameter block for facilitating despreading operation.

37. The apparatus of claim 34, further comprising means for spreading sequence index and spreading type in accordance with the normalized REs and a fourth set of parameters.

38. The apparatus of claim 34, further comprising means for retrieving a fifth set of parameters from a configuration parameter block for managing descrambling operation.

39. The apparatus of claim 38, further comprising means for generating descrambled REs in response to the normalized REs and the fifth set of parameters.

40. The apparatus of claim 34, further comprising means for receiving a first symbol of the uplink transmission from a soft demapper.

41. An apparatus for facilitating information processing from a network communication, comprising:

a receiver configured to receive resource elements ("REs") of an uplink transmission from a communication network;

a gain normalizer coupled to the receiver and configured to generate normalized REs in accordance with a first set of parameters;

an inverse transform block coupled to the gain normalizer and configured to provide time domain signals by performing an inverse transform of the normalized REs to in response to a second set of parameters; and a detector coupled to the inverse transform block and capable of detecting one of two processing types in response to the normalized REs and a third set of parameters.

42. The apparatus of claim 41, further comprising a configuration parameters block coupled to the receiver and configured to provide the first set of parameters, the second set of parameters, and the third set of parameters.

43. The apparatus of claim 41, further comprising a despreader coupled to the detector and configured to spread sequence index and spreading type for providing combining information in accordance with the normalized REs and a fourth set of parameters.

44. The apparatus of claim 41, further comprising a reference signals ("RS") remover coupled to the gain normalizer and configured to remove one or more RS REs from the normalized REs to generate a stream of data.

45. The apparatus of claim 41, further comprising a layer demapper coupled to the detector and configured to generate demapped data in accordance with a stream of data.

46. An apparatus for facilitating information processing from a network communication, comprising:

a receiver configured to receive resource elements ("REs") of an uplink transmission from a communication network;

a gain normalizer coupled to the receiver and configured to generate normalized REs in accordance with a first set of parameters;

a reference signals ("RS") remover coupled to the gain normalizer and configured to remove one or more RS REs from the normalized REs to generate a stream of data; and a layer demapper coupled to the RS remover and configured to generate demapped data in accordance with the stream of data.

47. The apparatus of claim 46, further comprising a detector coupled to the receiver and capable of detecting one of two processing types in response to the normalized REs and a third set of parameters.

48. The apparatus of claim 46, further comprising an inverse transform block coupled to the gain normalizer and configured to provide time domain signals by performing an inverse transform of the normalized REs to in response to a second set of parameters.

49. The apparatus of claim 46, further comprising a configuration parameters block coupled to the receiver and configured to provide the first set of parameters, a second set of parameters, and a third set of parameters.

50. The apparatus of claim 46, further comprising a despreader coupled to the receiver and configured to spread sequence index and spreading type for providing combining information in accordance with the normalized REs and a fourth set of parameters.

\* \* \* \* \*